(12) United States Patent
Allen et al.

(10) Patent No.: US 10,181,873 B2
(45) Date of Patent: Jan. 15, 2019

(54) ENHANCED POWERLINE COMMUNICATION METHODS AND DEVICES

(71) Applicant: STMicroelectronics, Inc., Coppell, TX (US)

(72) Inventors: James D. Allen, La Grange, KY (US); Oleg Logvinov, East Brunswick, NJ (US)

(73) Assignee: STMICROELECTRONICS, INC., Coppell, TX (US)

( * ) Notice: Subject to any disclaimer, the term of this patent is extended or adjusted under 35 U.S.C. 154(b) by 391 days.

(21) Appl. No.: 14/980,641

(22) Filed: Dec. 28, 2015

(65) Prior Publication Data

US 2017/0187420 A1    Jun. 29, 2017

(51) Int. Cl.
*H04B 3/54* (2006.01)
*H04L 12/24* (2006.01)
*H04L 29/08* (2006.01)

(52) U.S. Cl.
CPC ............. *H04B 3/54* (2013.01); *H04L 41/12* (2013.01); *H04L 67/12* (2013.01)

(58) Field of Classification Search
CPC .................................. H04B 3/54; H04L 41/12
USPC ........................................... 104/88.01–88.06
See application file for complete search history.

(56) References Cited

U.S. PATENT DOCUMENTS

| | | | | |
|---|---|---|---|---|
| 6,550,391 | B1* | 4/2003 | Ostwald | G11B 15/6805 104/88.02 |
| 6,679,459 | B2* | 1/2004 | Kaiser | B61B 3/02 104/88.03 |
| 6,721,627 | B2* | 4/2004 | Udou | B65G 1/0485 104/88.01 |
| 7,303,169 | B2* | 12/2007 | Hori | B61L 23/005 104/88.02 |
| 7,461,598 | B2* | 12/2008 | Shiwaku | B61B 1/00 104/87 |
| 8,322,287 | B2* | 12/2012 | Oguro | B65G 37/02 104/88.01 |
| 8,537,819 | B2* | 9/2013 | Koga | H04B 3/54 370/338 |

(Continued)

*Primary Examiner* — Zachary L Kuhfuss
(74) *Attorney, Agent, or Firm* — Seed IP Law Group LLP

(57) ABSTRACT

A powerline communication system includes a plurality of rail segments. Each of the rail segments is electrically isolated from other rail segments, and each receives power from a rail segment power supply. At least one cart operates on the rail segments. The cart has a powerline communications controller. Each rail segment has a current state defined by how many and which carts are operating on the rail segment. A central coordinator is coupled to each rail segment and configured to execute a channel estimation using a sounding protocol on its rail segment. The central coordinators store tone maps associated with the possible states of its rail segment, and possibly its adjacent rail segment. A main controller communicates with each central coordinator to direct the state and future state of its segment so that tone maps and network keys can be managed by the CCo in advance of an imminent state change. The main controller or CCo may also execute channel estimation using a sounding protocol and cause updated tone map information to be sent to each central coordinator in advance of an imminent state change.

27 Claims, 5 Drawing Sheets

(56) References Cited

U.S. PATENT DOCUMENTS

| | | | | |
|---|---|---|---|---|
| 8,879,613 | B1* | 11/2014 | Hui | H04B 3/54 |
| | | | | 370/252 |
| 9,258,093 | B2* | 2/2016 | Avudainayagam | ........................ |
| | | | | H04L 25/0204 |
| 9,590,790 | B2* | 3/2017 | Hui | H04B 3/54 |
| 9,698,867 | B2* | 7/2017 | Hui | H04B 3/54 |
| 2010/0073149 | A1* | 3/2010 | Goldfisher | H04B 3/54 |
| | | | | 370/241 |

* cited by examiner

ENHANCED POWERLINE COMMUNICATION METHODS AND DEVICES

BACKGROUND

Technical Field

The present disclosure generally relates to powerline communications. More particularly, but not exclusively, the present disclosure relates to powerline communications as applied to vehicles powered by conductive or inductive rails.

Description of the Related Art

In many industrial, manufacturing, commercial, and other settings, powerline communication mediums are employed to distribute power to one or more nodes in a system. Some or all of the nodes in the system use the conduits that pass power to concurrently communicate data.

In certain known vehicle systems, for example, carts travel on rails in a factory or warehouse environment. In the system, the carts use the rails for guidance, as a conduit to transfer electrical power to the carts, and as a communication medium to transfer data between carts and other communication-capable nodes in the system. These systems are conventionally used for automated distribution of components in warehouses or the factory floor.

Within these conventional systems, the rail is provided with its own power supply. The power supply sources power to each cart operating on the rail system. Also within the system, the rail has an associated PLC central coordinator, which may also be referred to as a central controller (CCo). The CCo performs several network management functions such as association, authentication, node admission control, quality of service (QoS) guarantees, and the like. As carts travel within the system, the carts are in communication with the CCo passing and receiving data associated with position, speed, operational characteristics, functional characteristics, and the like.

In an exemplary conventional system, the rail lines are formed with long rails or rail segments joined as a single electrical and communicative conduit. A single powerline communications (PLC) central coordinator (CCo) directs communications in the logical PLC network. Carts move constantly throughout the system as on a single continuous rail, and generally, the carts move between destinations at a constant speed.

In the exemplary conventional system, each cart operates as a single PLC communications node within the logical PLC network. Communications with each PLC node (i.e., cart) may occur, for example, according to a time division multiple access (TDMA) protocol. The PLC CCo may operate as a master that polls each node (i.e., cart), and in response, the node is granted a particular session window within which data is communicated. The duration of each session window can be selected based on the speed of carts within the system, which may be substantially constant. In the exemplary conventional system, for example, a session window is 128 milliseconds (ms) per node. Accordingly, it may be recognized that a conventional powerline communications network may have an upper limit of operating PLC nodes (i.e., carts) based on the fixed session window time set by the PLC CCo for communicating with each cart.

Also in the conventional system, the PLC CCo is communicatively coupled to a second computing system that is separate from the PLC network. The second computing system, which may be accessible via a different network (e.g., Ethernet), accepts information associated with the PLC network and information associated with the carts operating on the rail system. The second computing system also provides information and directions to the PLC CCo and the carts.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The use of conventional tools and methodologies to develop and operate powerline communication systems has led to the discovery of significant drawbacks with the conventional approach. Conventional powerline communication (PLC) systems have heretofore been slow and inefficient. It has also been observed that PLC rail channel characteristics vary as one or more carts move around the system, and the variance makes communications difficult. In addition, the conventional system is limited to a particular number of PLC nodes (i.e., carts) that can concurrently operate due to the timing constraints established or otherwise enforced by a conventional central coordinator (CCo).

To solve the problems associated with a single, continuous rail system and a single PLC logical network, embodiments of the present invention form a rail system as a plurality of interconnected rail segments. Each rail segment may have an associated power supply and an associated CCo. The rail segments may be electrically and communicatively isolated from each other, and the plurality of CCo's may be organized on a second network separate from the plurality of independent PLC networks. In some cases, a main controller organizes or otherwise manages communications between the plurality of CCo's.

It has further been recognized that adjacent network segments may be subject to crosstalk, which increases protocol contention, and as communication nodes move from one network segment to another, it has been observed that noise is introduced and communications channel characteristics of the segments change, which leads to problems with various communications latencies and error rates.

This present disclosure improves over known systems that employ powerline communications over the rails. A plurality of logical PLC network segments are arranged to form a powerline communication system. A main controller directs operations of the entire system.

Each logical PLC network segment in the powerline communication system is separate and distinct from the other PLC network segments, and each segment is arranged to facilitate the transfer of data by various nodes communicating within the PLC network domain. The nodes enter and exit the logical PLC network segment at different times, and at any given time, zero, one, or more nodes may be operating within the segment.

Each logical PLC network segment has a dedicated central coordinator (CCo). The central coordinator manages communications to and from the segment, and the central coordinator also manages communications within the segment. Accordingly, the main controller of the powerline communication system can direct operations of each logical PLC network segment via communications with the central coordinator of each of the network segments.

In some cases, the main controller of the powerline communication system directs certain central coordinators when to permit communications and when to remain communicatively silent. In some cases, the main controller directs certain central coordinators to select particular tone values for use in communications. The operations signaled to each central coordinator in some cases is based on information about each network segment's communications channel characteristic for every combination of nodes that can be present and operating within the respective segment. By selecting communication parameters according to known network configurations, powerline communications can be improved.

In one embodiment, for example, a powerline communication system is formed with a known number of logical PLC network segments. In the embodiment, the number of nodes operating within the system is also known. Accordingly, since the number of network segments is fixed, and since the number of possible operating nodes is fixed, the system may be recognized as a finite state machine. Within the finite state machine, a central controller can recognize each possible subsequent state based on the present state of the system. In this case, each state is separated from another state by a fixed or variable length of time.

For example, a finite number of states are defined wherein a first cart is operating on a first rail segment at a first time. A finite number of possible "next" states may also be defined wherein each of the possible "next" positions of the first cart at a second time are considered. More specifically, at the second time, the first cart may continue to operate on the first rail segment, or at the second time, the first cart may be in transition (or have transitioned) to a second rail segment. In this way, a "rail network map" may be formed for each possible state of the finite state machine.

As described in the example, a plurality of network maps can be recognized wherein each map represents one possible configuration (i.e., state) of the entire system, and a separate map can be recognized for every possible configuration. Each network map can define particular communication parameters to be used when the rail system is in a particular associated state. Thus, based on the state of the powerline communication system at any given time, the main controller can direct communication parameters of each network segment to improve reliability, efficiency, throughput, and other characteristics of the PLC network communications.

For example, in some cases, it is known that communications from one logical PLC network segment will disrupt the communications of another logical PLC network segment by adding noise, unnecessary communications traffic, crosstalk, or some other disruption. With foreknowledge of each one of the various states of the system, and with foreknowledge of each possible "next" state, the main controller may direct communication parameters to reduce the amount of disruption.

In this or other embodiments, the foreknowledge of the various states of the powerline communication system may also be used in other ways. For example, when the main system controller recognizes one particular system state, the main controller may also recognize or otherwise predict an imminent move of a certain node from one logical PLC network segment to another. Upon such recognition, the main controller can provide information to affected central coordinators of the coming change, which is the certain node leaving one network segment and entering a different network segment.

In one case, the central coordinator may be directed to program a node that is leaving its segment with a network encryption key (NEK) of a segment that the node will be entering. In another case, a central coordinator will be provided with node identifier information for a node that will be entering the segment. In these or still other cases, the communications of a particular network segment may occur using different tones (i.e., carrier frequencies) directed by a particular tone map defined for each rail segment. Since communications between carts and central coordinators on each rail segment operate according to a particular tone map, interference between one rail segment and adjacent rail segments can be reduced. The communication of other information based on past, current, and future states of the powerline communication system are also considered.

A powerline communication system may be summarized as including: a plurality of rail segments, each of the plurality of rail segments electrically isolated from others of the plurality of rail segments, each of the plurality of rail segments configured to receive power from a rail segment power supply; at least one cart configured for operation on the plurality of rail segments, the at least one cart having a drive mechanism, and the at least one cart having a cart controller configured for powerline communications, wherein each of the plurality of rail segments has a current state defined at least in part by cart information representing carts operating on the respective rail segment; a plurality of central coordinators, each central coordinator of the plurality of central coordinators coupled to a respective one of the plurality of rail segments, each central coordinator of the plurality of central coordinators configured to execute a sounding protocol on its respective one of the plurality of rail segments, and each central coordinator of the plurality of central coordinators configured to store a current tone map associated with the current state of the respective one of the plurality of rail segments; and a main controller, the main controller communicatively coupleable to each of the plurality of central coordinators, the main controller configured to direct execution of the sounding protocol on each of the plurality of central coordinators.

The main controller may be configured to recognize an imminent state change to at least one of the plurality of rail segments. Based on the recognition of the imminent state change to the at least one of the plurality of rail segments, the main controller may be configured to communicate information representing an updated tone map associated with an updated state of the respective one of the plurality of rail segments to a central coordinator coupled to the respective one of the plurality of rail segments. After receiving the information representing the updated tone map, the central coordinator coupled to the respective one of the plurality of rail segments may be configured to pass updated tone map information to each cart that will be operating on the respective one of the plurality of rail segments after the imminent state change. Based on the recognition of the imminent state change to the at least one of the plurality of rail segments, the main controller may be configured to communicate information representing a second updated tone map associated with an updated state of a rail segment adjacent to the respective one of the plurality of rail segments to the central coordinator coupled to the respective one of the plurality of rail segments. After receiving the information representing the second updated tone map, the central coordinator coupled to the respective one of the plurality of rail segments may be configured to pass second updated tone map information to each cart that will be operating on the rail segment adjacent to the respective one of the plurality of rail segments after the imminent state change. Each of the plurality of rail segments may be configured to operate as a logical subnet having an associated network identifier and an associated network encryption key. The sounding protocol may be arranged to characterize a noise environment and record channel characteristics for each possible state of each of the plurality of rail segments. The sounding protocol may be executed during a training session, the training session arranged to capture noise environment and channel characteristics for each possible state of each of the plurality of rail segments. Sounding data may be collected over time and averaged, the averaged sounding data used to generate tone map information.

A method of powerline communications on a rail system may be summarized as including: providing a first rail segment and a second rail segment, the first and second rail segments electrically isolated from each other; operating a powerline communication-enabled vehicle on the rail system, the powerline communication-enabled vehicle arranged to travel from the first rail segment to the second rail segment; operating a first powerline communication subnet on the first rail segment, the first powerline communication subnet defined at least in part by a first network identifier; operating a second powerline communication subnet on the second rail segment, the second powerline communication subnet defined at least in part by a second network identifier; operating a first sounding protocol on the first powerline communication subnet, the first sounding protocol arranged to collect network characteristics under selected states of the first rail segment, each selected state defined by powerline communication-enabled vehicles operating on the first rail segment; generating a tone map for each state of the first rail segment; recognizing an imminent state change to occur on the first rail segment, a state change defined by at least one powerline communication-enabled vehicle entering or exiting a rail segment; and communicating first updated tone map information to a central coordinator associated with the first rail segment, the first updated tone map information corresponding to the imminent state change to occur on the first rail segment.

Operating the first powerline communication subnet may include ciphering data according to a first network encryption key, and wherein operating the second powerline communication subnet may include ciphering data according to a second network encryption key. The method may include: operating a second sounding protocol on the second powerline communication subnet, the second sounding protocol arranged to collect network characteristics under selected states of the second rail segment, each selected state defined by powerline communication-enabled vehicles operating on the second rail segment; generating a tone map for each state of the second rail segment; recognizing an imminent state change to occur on the second rail segment; and communicating second updated tone map information to a central coordinator associated with the second rail segment, the second updated tone map information corresponding to the imminent state change to occur on the second rail segment. The method may include: communicating network information associated with the updated tone map information corresponding to the imminent state change to occur on the second rail segment from the central coordinator associated with the first rail segment to a first powerline communication-enabled vehicle operating on the first rail segment, the first powerline communication-enabled vehicle operating on the first rail segment being a vehicle that will operate on the second rail segment after the imminent state change occurs on the second rail segment. The network information associated with the updated tone map information corresponding to the imminent state change to occur on the second rail segment may include the second network identifier. The first sounding protocol may be executed during a first training session, the first training session arranged to capture noise environment and channel characteristics for each possible state of the first rail segment.

A rail system configured for communication according to a powerline communications protocol may be summarized as including: a main controller of the rail system; a first rail segment; a second rail segment mechanically coupled to the first rail segment, the first and second rail segments electrically isolated from each other, wherein the first and second rail segments are configured to permit travel of powerline communication-enabled vehicles from one rail segment to another rail segment; a first central coordinator, the first central coordinator configured to: operate a first powerline communication subnet on the first rail segment, the first powerline communication subnet defined at least in part by a first network identifier; operate a first sounding protocol on the first powerline communication subnet, the first sounding protocol arranged to collect network characteristics under selected states of the first rail segment, each selected state defined by powerline communication-enabled vehicles operating on the first rail segment; and communicate the collected network characteristics under the selected states of the first rail segment to the main controller; and a second central coordinator, the second central coordinator configured to: operate a second powerline communication subnet on the second rail segment, the second powerline communication subnet defined at least in part by a second network identifier, wherein data passed on the second powerline communication subnet is ciphered according to a second network encryption key; operate a second sounding protocol on the second powerline communication subnet, the second sounding protocol arranged to collect network characteristics under selected states of the second rail segment; and communicate the collected network characteristics under the selected states of the second rail segment to the main controller.

The main controller may be configured to: generate a plurality of tone maps based on the collected network characteristics under the selected states of the first rail segment and the collected network characteristics under the selected states of the second rail segment; recognize a first imminent state change to occur on the first rail segment and a second imminent state change to occur on the second rail segment, a state change defined by at least one powerline communication-enabled vehicle entering or exiting a rail segment; communicate information representing a first updated tone map to the first central coordinator, the first updated tone map corresponding to the first imminent state change; and communicate information representing a second updated tone map to the second central coordinator, the second updated tone map corresponding to the second imminent state change. The first central coordinator controller may be configured to: communicate network information associated with the first updated tone map to a first powerline communication-enabled vehicle that will be operating on the first rail segment according to the first imminent state change; and communicate network information associated with the second updated tone map to a second powerline communication-enabled vehicle that will be operating on the second rail segment according to the second imminent state change. The main controller may be configured to: execute a first training session, the first training session arranged to capture noise environment and channel characteristics for each possible state of the first rail segment. The first and second rail segments may be communicatively isolated from each other.

Within the powerline communication devices and methods discussed in the present disclosure, network communications are improved. The innovation described in the present disclosure is new and useful, and the innovation is not well-known, routine, or conventional in the powerline communications industry.

The innovation described herein uses known building blocks combined in new and useful ways, along with other structures and limitations, to create something more than has heretofore been conventionally known. The embodiments improve on computing systems which, when un-programmed or differently programmed, cannot perform or provide the specific powerline communication features claimed herein.

The embodiments described in the present disclosure improve upon known powerline communication processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract; the claims present tangible, practical, and concrete applications of said allegedly abstract concepts.

The embodiments described herein use computerized technology to improve the technology of powerline communications, but there other techniques and tools that remain available to communicate data over a powerline system. Therefore, the claimed subject matter does not foreclose the whole or even substantial powerline communication technological area.

These features, with other objects and advantages which will become subsequently apparent, reside in the details of construction and operation, as more fully described hereafter and claimed, reference being had to the accompanying drawings forming a part hereof.

This Brief Summary has been provided to introduce certain concepts in a simplified form that are further described in detail below in the Detailed Description. Except where otherwise expressly stated, the summary is not intended to identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with networked computing devices have not been shown or described in detail to avoid unnecessarily obscuring descriptions of the embodiments.

Embodiments of the present invention are described generally with respect to powerline communication systems employed in certain industrial and other settings. Particular embodiments described herein are directed to powerline communication mediums employed to concurrently distribute power to one or more nodes in a system and allow data communications via the same conduits used to distribute power. In these embodiments, powerline communication-enabled vehicles (i.e., carts) travel on rails in a factory or warehouse environment, but these embodiments are not limiting. Rather, other devices, conduits, and environments are also contemplated. The embodiments described herein are selected to illuminate the inventive aspects of the enhanced powerline communication methods and devices described herein, and the selected embodiments do not limit application of the inventive ideas and concepts described herein to only the described embodiments.

Figure 1:
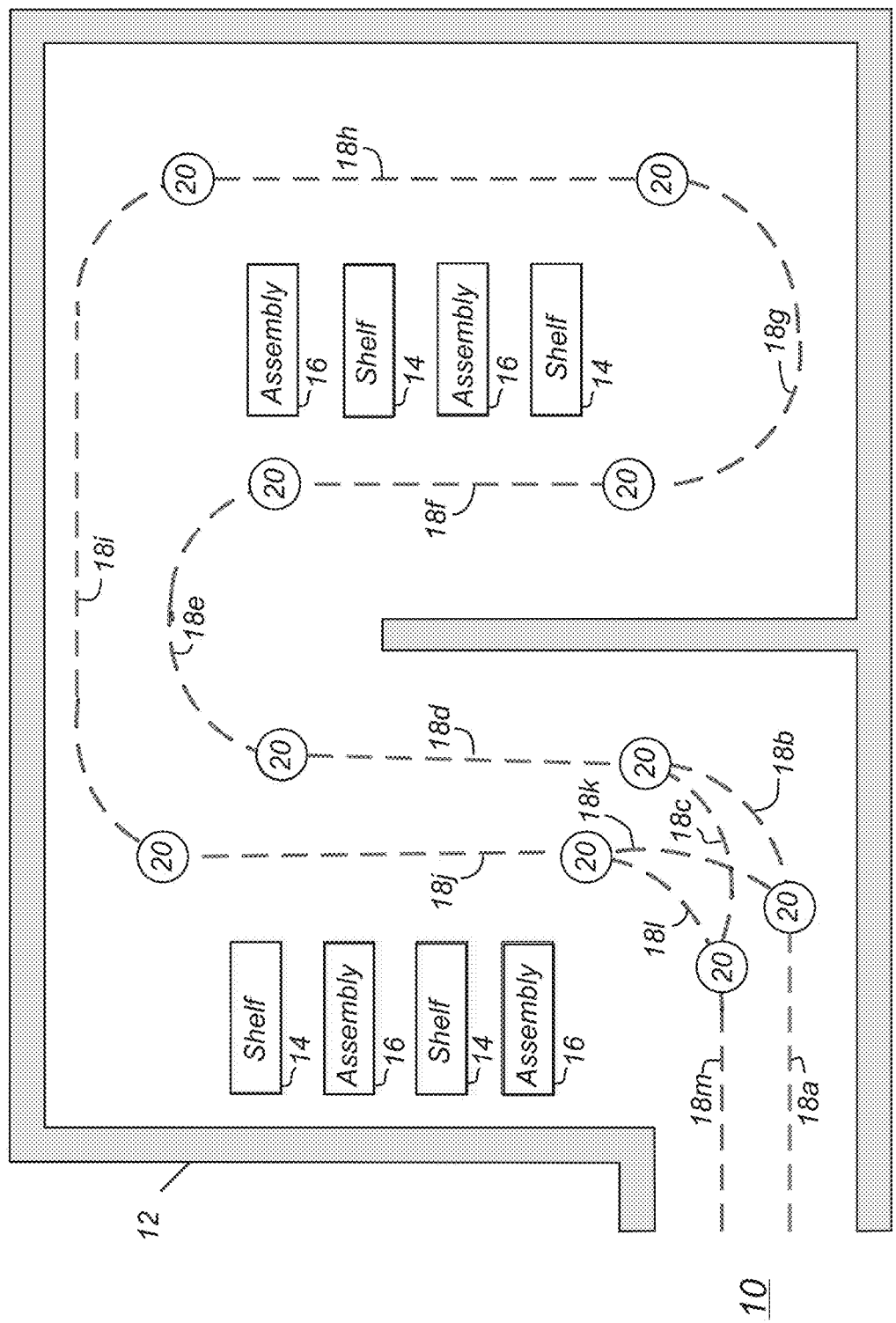
FIG. 1 illustrates an example of a segmented rail system in the context of a warehouse building.

FIG. 1 illustrates an example of a segmented rail system 10 in the context of a warehouse building 12. The rail system 10 may be used to guide automated carts, which deliver or retrieve parts to various shelving units 14 and assembly stations 16. The rail system 10 of FIG. 1 is comprised of thirteen rail segments identified with reference numbers 18a to 18m. Of course, more or fewer rail segments may also be used, and each of the thirteen rail segments may consist of one, two, or more physical rail portions. For example, rail segment 18e in FIG. 1 includes curved portions. Rail segment 18e may be formed from a single, curved physical rail or a plurality of rail portions that form the curve. Along these lines, rail segment 18f in FIG. 1 substantially straight. Rail segment 18f may be formed from a single straight physical rail or a plurality of rail portions. In some cases, rail segment 18f may be short enough that a single physical rail is used. In other cases, such as when rail segment 18f is tens or hundreds of feet long, rail segment 18f is formed from several physical rail portions.

In many embodiments, the rails of rail system 10 are formed as a pair of parallel bars of rolled steel along which carts or other vehicles can roll, similar to rails in the conventional transportation system that uses trains to pull passengers and freight. The rails of rail system 10 may be sized larger, smaller, or the same as conventional train systems. Correspondingly, carts in the described embodiments that travel on rail system 10 include at least four wheels configured as a pair of front wheels separated from each other by a first distance and a pair of rear wheels separated from each other by the same first distance. The wheels of such carts are mechanically supported by and travel along a pair of steel rails. In the context of FIG. 1, a cart may travel from rail segment to rail segment as if on a continuous rail, however in FIG. 1, each rail segment may represent a different communication network having a dedicated power source. The rails of each rail segment 18a-18m may be formed as parallel rails, three-wide rails, or some other number of rails. In some cases non-communicative, non-power-carrying rails are formed to physically support the carts, while one, two, or more rails or other conduits are formed to carry power and communications traffic within each rail segment. Accordingly, the individual rail segments of rail system 10 may be formed to suit the particular specifications of the environment based on size, weight, material, distance, and any other such factors. The carts that operate on the rail segments of rail system 10 may be similarly formed with any number of axles, any number of wheels, and even non-wheeled support and travel systems to suit the particular environment.

In some cases, the rail system 10 is a directly powered rail system. A wide variety of other power supply systems are also contemplated, including but not limited to inductively powered rail or rail-less systems that may employ a buried wire for communications, guidance, and/or power; overhead cable suspension systems, laser powered systems, and other types of power distribution schemes. In some cases, the power transfer is performed via a suitably sized metallic conductor. In other cases, a power transfer using non-contact inductive or capacitive connections are used.

In operation, the rail segments 18a-18m may provide power to each individual cart for the cart's traction system as well as the cart's control system. Alternatively, or in addition, each cart may also have an on-board power system or some other different local or group power source. In some cases, one or more of an electric motor, an engine, a mechanical transmission, a levitation system, or some other mechanism may make up the traction system of each cart.

In FIG. 1, rail segments 18a-18m are electrically isolated from each other. As indicated by isolators 20, each rail segment is separate and distinct from other rail segments with respect to power supply functions and powerline communications. The isolators 20 may be formed with electronic circuits, insulating materials, a combination of circuitry and insulating material, or by some other means. For example, electronic circuit-based isolators 20 may be transformer-based circuits, switch-based circuits, or some other circuitry. As another example, various discrete materials such as glass, rubber, ceramics, air, and other materials may be used to form isolators 20.

In some embodiments, carts that operate on rail segments 18a-18m have electrically isolated wheels or other points of contact arranged to avoid electrically, communicatively, or electrically and communicatively shorting one rail segment to an adjacent rail segment when a cart crosses an isolator 20 boundary. For example, in a four-wheel cart, a pair of front wheels may cross into a second rail segment while a pair of rear wheels remains in a first rail segment. In these cases, if the front wheels are not electrically isolated from the rear wheels, and if the cart frame or body is electrically conductive, the first and second rail segments may be shorted together as the cart travels across the rail segment boundary (e.g., isolator 20). In other embodiments, a central controller that recognizes imminent crossing of a cart across a segment boundary may control power and communications to prevent such shorting.

Since rail segments 18a-18m are isolated, each segment is arranged to operate as its own independent communications network. By forming the rail system 10 into the set of shorter rail segments 18a-18m, the communication and power load to each segment is reduced. For example, in a large rail system, hundreds of carts may be in operation at any given time. Due to the segmentation, however, each rail segment may have fewer carts in operation at any given time. Consequently, communication latencies may be smaller, segment controllers may require less computational power, and other benefits may also be realized.

Figure 2:
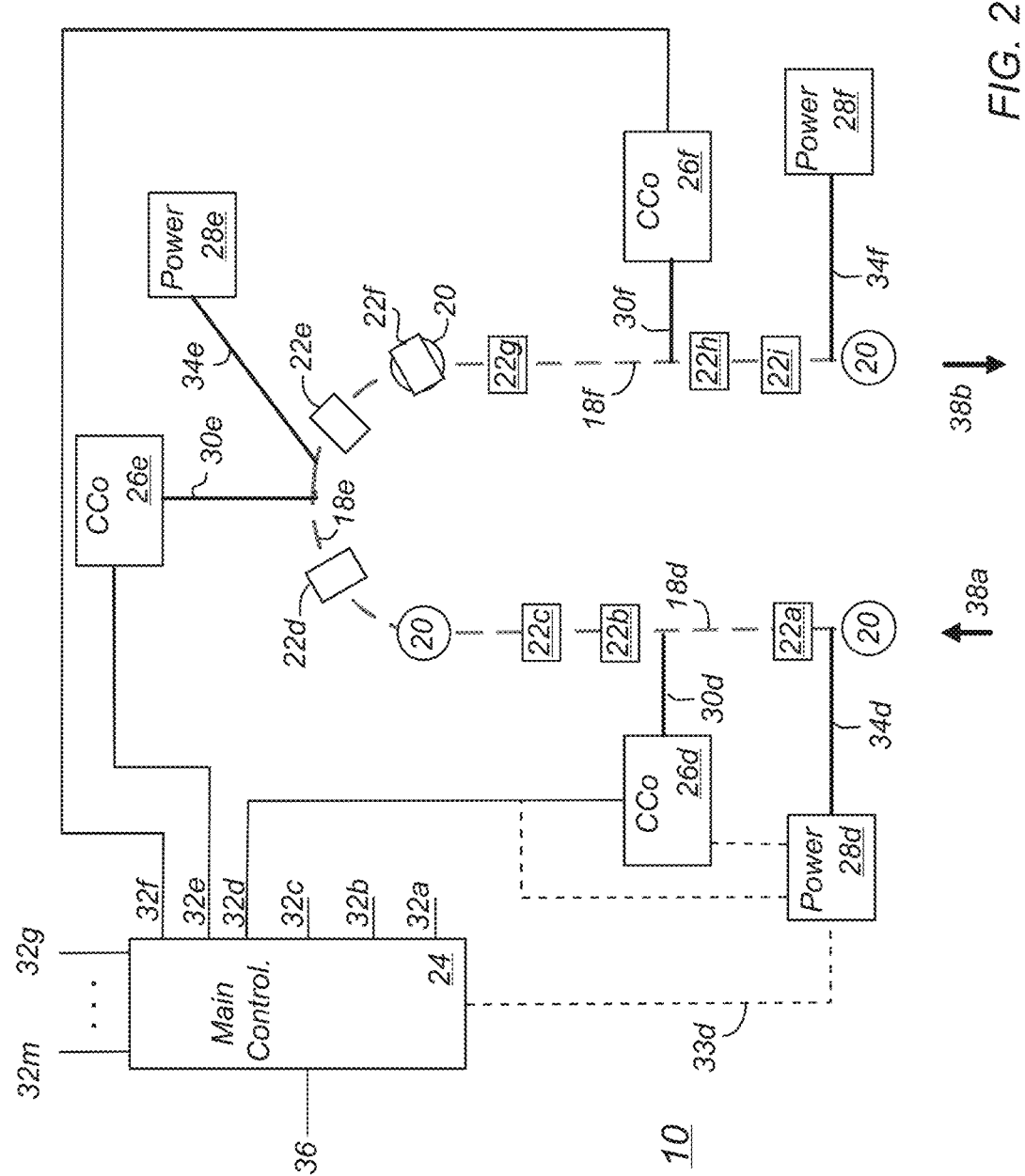
FIG. 2 is a section of the rail system showing an embodiment of carts, communications, power, and control equipment.

FIG. 2 is a section of rail system 10 showing an embodiment of carts, communications, power, and control equipment. The section of rail system 10 illustrated in FIG. 2 corresponds to rail sections 18d-18f of FIG. 1. In FIG. 2, a plurality of carts 22a-22i are illustrated along various sections of the rail system 10 moving in the directions illustrated by 38a-38b. In particular, three carts 22a-22c are operating on rail section 18d; two carts 22d-22e are operating on rail section 18e; one cart 22f is in transition between rail section 18e and rail section 18f; and three carts 22g-22i are operating on rail section 18f.

Each of the rail sections has a dedicated central coordinator (CCo), which also operates as a powerline communication modem for the section, and each rail section also has a dedicated power source. Specifically in FIG. 2, central coordinator 26d is coupled to rail section 18d via a first communication medium 30d, and power source 28d is coupled to rail section 18d via a power conduit 34d. Correspondingly, central coordinator 26e is coupled to rail section 18e via a first communication medium 30e, and power source 28e is coupled to rail section 18e via a power conduit 34e; and central coordinator 26f is coupled to rail section 18f via a first communication medium 30f, and power source 28f is coupled to rail section 18f via a power conduit 34f.

The dedicated power source for each rail segment may be implemented in many ways. For example, each rail segment may be arranged such that there are the same number of power sources in the rail system as there are rail segments. In other embodiments, one power source may supply power to several rail segments or even all of the rail segments in the rail system. In these cases, the power that is supplied to each rail segment may be filtered from the power that is supplied to other rail segments. By providing such filtering, powerline communications of one rail segment may be isolated from the powerline communications of other rail segments.

The powerline communication network operated on each rail segment 18a-18m is a closed system governed by the respective central coordinator 26a-26m (CCo's 26a-26c and 26g-26m are not shown). Devices that participate in each powerline communications network share a common network identifier (NID) and a common network membership key (NMK). Accordingly, a logical network defined by an NID and an NMK may be operating on each rail segment 18a-18m.

The NID and NMK are used to manage a network encryption key (NEK). Data passed on the network is encoded using the NEK. Accordingly, messages that legitimately belong on the network can be decoded, and other messages, such as those caused by crosstalk, cannot be decoded. Messages that cannot be decoded are ignored by network devices, but such messages cause communication inefficiencies such as increased latency, increased power-use, and other undesirable effects.

The main controller 24 of the rail system 10 may be configured to assign a unique NEK to each rail segment 18a-18m. Each NEK will be different from other NEKs in order to overcome crosstalk. Each NEK may also share particular properties such that each rail segment network is a logical subnet of a main network.

An architected scheme of NEK selection and assignment can provide benefits. One such benefit is group messaging, wherein network devices can all receive messages sent by the main controller 24. Another benefit is that the central coordinator 26a-26m of one rail segment 18a-18m can program the NEK of a subsequent rail segment into a cart that will imminently cross a rail segment boundary. In this way, the cart can communicate with the central coordinator of the new rail segment immediately after leaving the previous rail segment. If for some reason this process fails, a cart entering a new rail segment without a proper NEK will have to join the new network (i.e., logical subnet) using a known association (e.g., detection/authentication) technique.

Each central coordinator in the rail system 10 is coupled to a main controller 24 via a second communication medium 32a-32m, respectively. In FIG. 2, only three second communication medium links are illustrated for simplicity. These are second communication medium links 32d-32f, respectively coupled to central coordinators 26d-26f. Each central coordinator 26a-26f also includes powerline communication modem circuitry and software that cooperate to pass data to and from any carts 22a-22i that are operating on the respective rail segment 18a-18m.

In some embodiments, the main controller 24, a central controller, or a combination of the main controller 24 and a central controller communicate with each respective power supply. For example, optional communication lines are illustrated from the second communication medium 32d to power source 28d, from central controller 28d to power source 28d, and directly from the main controller 24 to power source 24 via a third communication medium 33d. Though not shown, it is understood that zero, one, or more power sources may be suitably coupled and controlled in a similar manner.

The main controller 24 includes a communication interface 36 that may be coupled to additional network resources such as a wide area network (e.g., the Internet), a different type of network, or another communication architecture. In some cases, interface 36 is coupled to a local area network (LAN), and the main controller receives direction from and reports status to a supervisory factory automation system (not shown).

The main controller 24 may be configured with one or more levels of supervisory control over the rail system 10.

In some cases, the main controller 24 performs merely observational functions. In these cases, the main controller 24 is arranged to gather status from each of the rail segment central coordinators 26a-26m, such as the number of carts operating on each rail segment, representative identifiers of each cart, service information or data associated with each cart, error or fault reports, and the like. In these cases, the main controller 24 may provide simple direction to individual central coordinators 26a-26m such as power-on, reset, report-status, and the like. Alternatively, the main controller 24 may simply receive status from central coordinators 26a-26m. In this configuration, the main controller 24 does not direct the operations of central coordinators 26a-26m or the operations of individual carts 22a-22i.

In other cases, the main controller 24 actively controls operations of one or more central coordinators 26a-26m, one or more carts 22a-22i, or both central coordinators 26a-26m and carts 22a-22i. That is, in some cases, the main controller 24 controls the position of every cart 22a-22i in the rail system 10 by dynamically directing the motion and position of every cart 22a-22i. In these cases, for example, instructions to each cart 22a-22i are communicated from the main controller 24 to a respective central coordinator 26a-26m, and further communicated via powerline communications through the respective rail segment 18a-18m to the identified cart 22a-22i. The central coordinator 26a-26m may be directly coupled to the power rail, inductive power circuit, or other power conduit; or the coupling may be through the respective rail segment power source 28a-28m. A powerline communication node on each cart 22a-22i receives and transmits data and instructions to the modules that control the operation of the cart.

Each rail segment 18a-18m has a different time invariant characteristic electrical noise signature over which a powerline communication modem must communicate. The signature is defined by particular parameters of the rail segment such as the rail segment's track type, its physical configuration (e.g., proximity to electrical ground planes), the rail segment's power source noise, the proximity to other noise sources, communication crosstalk from other rail segments, and other factors that are unique for each segment of track. Each rail segment's electrical noise environment is also affected by time and position variant noises caused by the position and operation of each cart on the rail segment. For example, electrical transients, noises, and power supply loading may all be caused by carts. These characteristics may be especially pronounced, or their effects may be especially exaggerated, as carts enter and exit the particular rail segment.

It has been observed that whenever a cart, which is a powerline communication node, leaves one rail segment and enters another, the electrical noise signatures of both rail segments change. In some cases, the changes cause one or both networks to network down, thereby forcing a recovery protocol. In addition to the change in noise signature, crosstalk can often cause each rail segment to spend extra time in protocol contention, discovery, and re-stabilization.

One way to mitigate the problems caused when carts frequently travel from one rail segment network to another is to allow polling of each cart node at a predictable rate, such as every 128 milliseconds (ms), with a low variability and using the collected information to update communication parameters within a rail segment network. Further problems can be mitigated by passing information associated with the communications from one rail segment to another (e.g., passing cart identifiers to a rail segment that the cart will soon enter). Still further problems are addressed by generating tone maps that direct communication parameters in a rail segment network and communicating the tone maps to various central coordinators as carts move within the system. Aspects of these and other solutions are described in the present disclosure.

Powerline communication (PLC) technologies, such as those specified in the HOMEPLUG ALLIANCE AV specification and the IEEE Std 1901-2010 standard, which are incorporated herein by reference, transfer data using an orthogonal frequency division multiplexing (OFDM) methodology. Many orthogonal carriers (tones) are used to transmit parts of a message over a much wider composite bandwidth than any single carrier uses by itself. In these protocols, a sounding process is used to characterize the noise environment and channel characteristics for each rail segment and record the rail segment's channel characteristics for each rail state. The sounding process information is used to determine the communication capabilities of each carrier or group of carriers within the frequency band used by the PLC network. Carriers that can support higher orders of modulation are used to send more data than carriers that are more likely subject to interference, which use lower orders of modulation. The sounding process is used to create a list, or "tone map," of each active carrier's information carrying capability. When a tone map is used by a cart node, communications between the cart node and the central coordinator can be improved. What's more, when a cart node is provided with a tone map associated with a rail segment that will next be entered, communications within the rail segment that will soon be entered can also be improved.

In more detail of certain embodiments, the transmission band in OFDM communications systems is broken up into multiple modulated carriers (i.e., tones) that individually use smaller bandwidths than if the entire bandwidth were modulated with one carrier. This division of the available bandwidth makes the resulting communication system more robust to certain types of noise and channel fading. In these cases, one or more tone maps can be created having entries that represent the status (i.e., availability for use) of each tone along with the modulation methods for each tone.

The tone maps as discussed herein may take any form. The data in a particular table generally indicates whether a tone is in use or available for use, along with particular parameters indicating the type of modulation used for each tone, such as transmission gain, modulation type, a link quality indicator, power control for one or more sub-bands, various mode support parameters, various quality of service parameters, certain user-defined parameters, and so on. The information in a tone map can be used by a transceiver or control mechanism of a transceiver to maintain and improve a signal (e.g., changing a transmitter gain, selecting particular tones to transmit more data, and the like).

In some cases, one tone map table for each central controller is formed and maintained. In other cases, one tone map table for each cart is formed and maintained. In these cases, the particular table is updated, replaced, or otherwise modified as various states of the rail system are encountered. These cases may particularly involve one or more controllers (i.e., a main controller or one or more central controllers) expressly communicating tone map data to one or more carts.

In other cases, rather than making modifications to one or more tone map tables, a plurality of tables are created and stored in various memories associated with the system. In these cases, an index method or some other method may be employed to allow a controller to select different, pre-established tone maps. This index or similar method may be faster than other methods that involve modifying a particular tone map table, communicating said modifications, and enabling the changed tone map for use. For example, in some embodiments of the present disclosure where an index or other method are employed, one or more tone maps may be pre-created (e.g., during a training session) or dynamically created (e.g., during normal operation) per segment state and for each node in the segment. These pre-created or dynamically created tone maps may be stored in available memories that are accessible to the associated controller and PLC node (i.e., cart).

Generally speaking, an OFDM-based sounding protocol works well for networks that do not physically change, or that change slowly. A relatively significant amount of time is required, however, to collect data and to calculate a tone map that will substantially improve communications. In electrically noisy and rapidly changing channels, such as a rail segment 18a-18m, the time required to produce a satisfactory tone map increases, which can affect the network's latency and throughput data rate. On the other hand, failure to use the sounding protocol exposes communications on the rail segment to unacceptably excessive error rates, which also affects latency and throughput data rate.

In a rail system, such as in rail system 10 of FIGS. 1 and 2, the number of carts and rail segments is limited. Accordingly, the entire system may be analyzed as a large state machine that considers every possible combination of cart and rail segment configuration at any given time. The system can be further analyzed to identify combinations of carts and rail segment configurations that result in measurably different communication channel characteristics on a rail segment. In one training method, the main controller 24 can be used to place carts in every possible configuration or "state," and tone map data can be collected to identify states that have improved communication characteristics. The states having improved characteristics can then be used by the main controller 24 to direct operations of the rail system 10. Alternatively, in a different training method, the main controller 24 can perform sounding operations while the rail system 10 is in use, and the main controller 24 can accumulate, average-over-time, and otherwise analyze the data so as to learn which states provide improved communication. The main controller 24 can continually improve its communication capabilities (e.g., reduced data bit rate, greater accuracy, and the like), as time goes on by repeatedly collecting, analyzing, and generating tone map data, providing updated tone maps, and directing cart operations amongst the rail segments in desirable configurations. These different tone maps may be indexed by number so they can be quickly communicated and activated.

In normal operation of rail system 10, the main controller 24 is aware of the current state of each cart 22a-22i within each segment 18a-18m. The main controller 24 is also configured to recognize which "next" state is imminent based on information from each cart 22a-22i. In some cases, the main controller 24 is also configured to predict when a state will change. With this a priori information, the main controller 24 is configured to signal central coordinators 26a-26m that will be affected in subsequent intervals and pass relevant state information to those central coordinators 26a-26m. This signaling may occur in real time. Using the information from the main controller 24, the affected central coordinators 26a-26m can adjust the respective rail segment tone map to improve communications. The central coordinators 26a-26m in some cases take action before the state change, such as within 50 milliseconds; alternatively, the central coordinators may take action to adjust a tone map only after a state change.

Alternatively, or in addition, individual cars operating on rail system 10 may participate in the operations that update network communications on each rail segment 18a-18m. For example, using electronic position sensors, LED-based light sensors (e.g., infrared beam), or some other signaling mechanisms, one or more carts 22a-22i may intelligently recognize when a state change is imminent. In some cases, each of such carts 22a-22i may provide such information to their current central coordinator 26a-26m. In some cases, each of such carts 22a-22i may self-update a tone map to a known condition, a predicted condition, a default condition, or some other condition. The update in the respective cart 22a-22i may occur prior to the rail segment state change, during the rail segment state change, or soon after the rail segment state change.

Considering one case illustrated in FIG. 2, cart 22f passes from rail segment 18e to rail segment 18f. The main controller 24 may recognize that a state change to rail segment 18e and a state change to rail segment 18f is imminent. The main controller 24 may recognize the coming state change based on the position of cart 22f, the motion of cart 22f, information from the isolation device 20 between rail segment 18e and rail segment 18f, or in some other way. One or more sensors associated with the isolation device 20, rail segment 18e, rail segment 18f, and cart 22f may capture information associated with the state change, and the information may be passed from cart 22f through a central coordinator 26e, 26f to the main controller 24.

After the main controller 24 recognizes the imminent state change caused by cart 22f crossing a rail segment boundary, the main controller may communicate timing information to both central coordinator 26e and central coordinator 26f. The timing information may be an identified time when the state change will occur, a time differential from a reference point in time, or some other time information. In addition, the main controller may pass tone map information, car identifier information, network encryption key information, and other network-relevant information to one or both of central coordinator 26e and central coordinator 26f. The respective central coordinators will pass the received network-relevant information or other information to each cart on the rail segment.

For example, in one case, the main controller 24 will identify updated data for rail segment 18e and updated data for rail segment 18f. The updated data for each rail segment will include an updated tone map and an updated network key, and the updated data may optionally include timing information associated with a time when the state will change. The updated data for rail segment 18e will be sent to or otherwise retrieved by central coordinator 26e, and central coordinator 26e will pass the updated data for rail segment 18e to cart 22d and cart 22e. In addition, the updated data for rail segment 18f will be sent to or otherwise retrieved by central coordinator 26e, and central coordinator 26e will pass the updated data for rail segment 18f to cart 22f. Finally, the updated data for rail segment 18f will be sent to or otherwise retrieved by central coordinator 26f, and central coordinator 26f will pass the updated data for rail segment 18f to cart 22g, cart 22h, and cart 22i. In this way, each of central coordinator 26e, central coordinator 26f, and carts 22d-22i will have both current network information (e.g., tone map, network key, and the like), and future network information (e.g., future tone map, future network key, and the like). Each central coordinator and each cart will also have timing information that directs the device as to when to apply the updated (i.e., future) network information.

In some embodiments, the timing information is not critical. That is, in some embodiments, carts move slowly enough and communications are dispersed enough that a common clock source between various controllers in the rail system 10 is not used. In other embodiments, such as those where there are many carts and the carts move at high speed, various controllers may also use a synchronized clock source, a transmitted time beacon, a synchronization scheme triggered on a network time base, or some other mechanism to coordinate the timing information between the central coordinators 26a-26m, the carts 22a-22i, and the main controller 24.

Using the update processes described herein, the sounding protocol information is pre-established, and the capture of new sounding information is not required during normal operation. By recognizing an imminent state change, the main controller 24 can direct updates to the network devices and thereby improve network performance of each logical subnet.

Within the rail system 10, it is recognized that the state of some rail segments 18a-18m may change from one interval to a next interval, and the state of other rail segments 18a-18m may remain constant through one or more intervals. It is within the scope of this disclosure that when a change in states results in the same tone map, or when a particular rail segment state will not change, the main controller 24 may or may not send directions to the affected central coordinator.

In some cases, the main controller 24 is configured to dynamically update state information, tone map information, and other system-wide information in real time. It is known that in some cases, carts 22a-22i are maintained or operating in a manner that changes the cart's effect on the communications channel. It is also known that adding new carts or removing existing carts from rail system 10 may also change state maps, tone maps, communication characteristics, and the like. In these cases, the main controller 24 can continue to capture sound information via a training session or during normal operation. In these and other cases, the main controller 24 may also capture empirical status data regarding communications during any particular state. If the main controller 24 determines that communications are unsatisfactory, for example, if data is not being reliably received in an allotted amount of time (e.g., 128 ms) or if a device requests channel characterization information more than once, additional sounding data can be captured, and additional tone map data can be generated.

Figure 3:
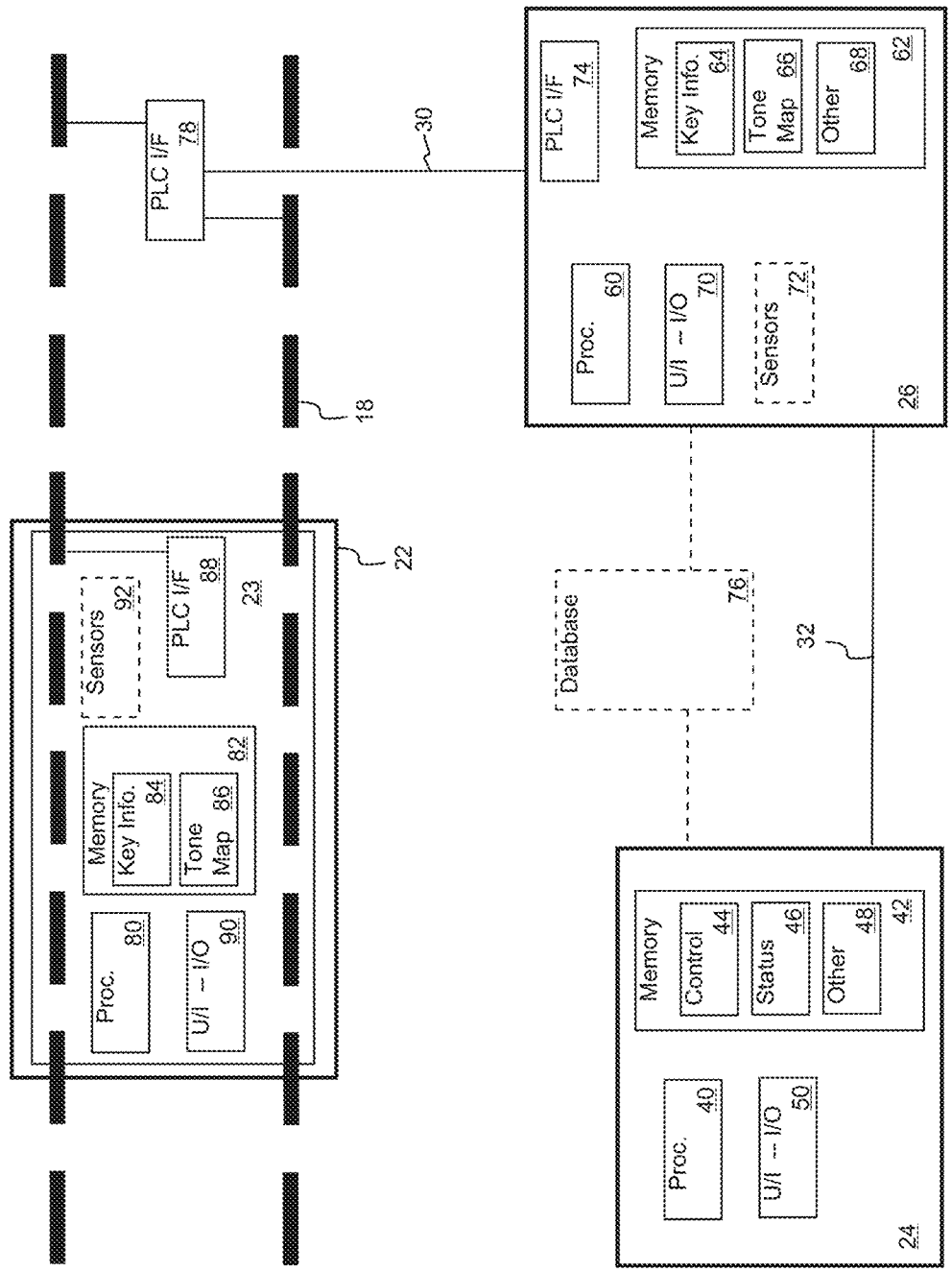
FIG. 3 is a block schematic diagram embodiment of a main controller, a central coordinator, and a node controller.

FIG. 3 is a block schematic diagram embodiment of a main controller 24, a central coordinator 26, and a cart 22, which includes a node controller 23. The cart 22 is operating on a rail segment 18. In FIG. 3, cart 22 may be any of carts 22a-22i of FIG. 1; central coordinator 26 may be any of central coordinators 26a-26m of FIG. 1; and rail segment 18 may be any of rail segments 18a-18m of FIG. 1.

In FIG. 3, the main controller 24 includes a processing unit 40, a memory 42, and a user interface input/output (I/O) module 50. The memory 42 includes a control module 44, a status module 46, and an "other" information module 48.

The central coordinator 26 includes a processor 60, a memory 62, a user interface I/O module 70, an optional sensors module 72, and a first powerline communications interface 74. The memory 62 of the central coordinator 26 includes a key information module 64, a tone map module 66, and an "other" information module 68. Communications between the main controller 24 and the central coordinator 26 may be facilitated via the second communication medium. An optional database 76 is communicatively accessible to one or both of the main controller 24 and the central coordinator 26.

The cart 22 in FIG. 3 is illustrated as operating on rail segment 18. Communications to and from the node controller 23 of cart 22 are facilitated via a second powerline communications interface 78 coupled to rail segment 18 (i.e., a PLC-to-rail interface). In some cases, the first powerline communications interface 74 and the second powerline communications interface 78 are coupled via the first communication medium 30. In other cases, the first and second PLC interfaces 74, 78 are a common interface. That is, in these cases, a single powerline communications interface associated with the central coordinator is configured to pass data directly to and from the rail segment 18 as a single PLC-to-rail interface. A processing unit 80, memory 82 including a key information module 84 and tone map module 86, a powerline communications interface 88 (e.g., a rail-to-PLC interface), a user interface I/O module 90, and an optional sensors module 92 are also included in the node controller.

As discussed herein, the main controller 24 controls operations of a rail system 10 (FIGS. 1, 2). The central coordinator 26 controls operations of a rail segment, and the node controller 23 controls operations of a cart 22. The controllers 24, 26, 23 respectively each have a processing unit 40, 60, 80; the controllers 24, 26, 23 respectively each have memory 42, 62, 82; and the controllers 24, 26, 23 respectively each have a user interface I/O module 50, 70, 90. The memory of the controllers 24, 26, 23 includes software instructions organized into programs, libraries, subroutines, and the like, which are executable by the processing unit to carry out the functions of the respective controller 24, 26, 23.

A user interface I/O module works cooperatively with the processing unit and memory of its respective controller 24, 26, 23 to pass data into and out from the controller. In some cases, an I/O portion of a user interface I/O module 50, 70, 90 includes a network interface to pass information to and from the respective controller 24, 26, 23. The network interface may packetize information passing from the controller 24, 26, 23, and the network interface may de-packetize information passing into the controller 24, 26, 23. In some cases, the network interface of an I/O portion of a user interface I/O module 50, 70, 90 facilitates communication to a local area network (LAN) such as an intranet, a wide area network (WAN) such as the Internet, or some other network or communications method. In some cases, one or both of the first communication medium 30 and second communication medium 32 are coupled to an I/O portion of a user interface I/O module 50, 70, 90.

In some cases, an I/O portion of a user interface I/O module 50, 70, 90 may provide an interface for devices such as buttons, keypads, computer mice, memory cards, serial ports, bio-sensor readers, touch screens, and the like, which may individually or in cooperation be useful to an operator of the particular controller 24, 26, 23. The devices may, for example, input control information into the controller 24, 26, 23. Displays, printers, memory cards, LED indicators, audio devices (e.g., speakers, piezo device, etc.), vibrators, and the like are all useful to present output information to an operator of the controller 24, 26, 23. In some cases, the input and output devices are directly coupled to the controller 24, 26, 23 and electronically coupled to the processing unit or other operative circuitry. In other cases, the input and output devices pass information via one or more communication ports (e.g., RS-232, RS-485, infrared, USB, etc.)

One or more transceivers may cooperate with the controllers 24, 26, 23. Transceivers provide unidirectional or bidirectional communications between one controller and another, for example via the first communication medium 30 and the second communication medium 32. The transceivers may be arranged to communicate over short distances (e.g., personal area networks, direct device-to-device communications) or long distances (commercial cellular services such as GSM, CDMA, LTE, and the like). In some cases, a Bluetooth transceiver is provided. In some cases, an IEEE 802.11 Wi-Fi transceiver is provided. In some cases, a cellular transceiver chipset is provided. Other wireless and wired communication transceivers and communication mediums may also be provided. The one or more transceivers of the controllers 24, 26, 23 can be configured to communicate control information, multimedia (i.e., audio/video) information, sounding information, tone information, identifiers, network keys, state data, or other information. In some cases, encryption modules (not shown) may encrypt, obfuscate, or otherwise cipher the data prior to communication, and decrypt, de-obfuscate, or otherwise decipher the data after communication.

Figure 4:
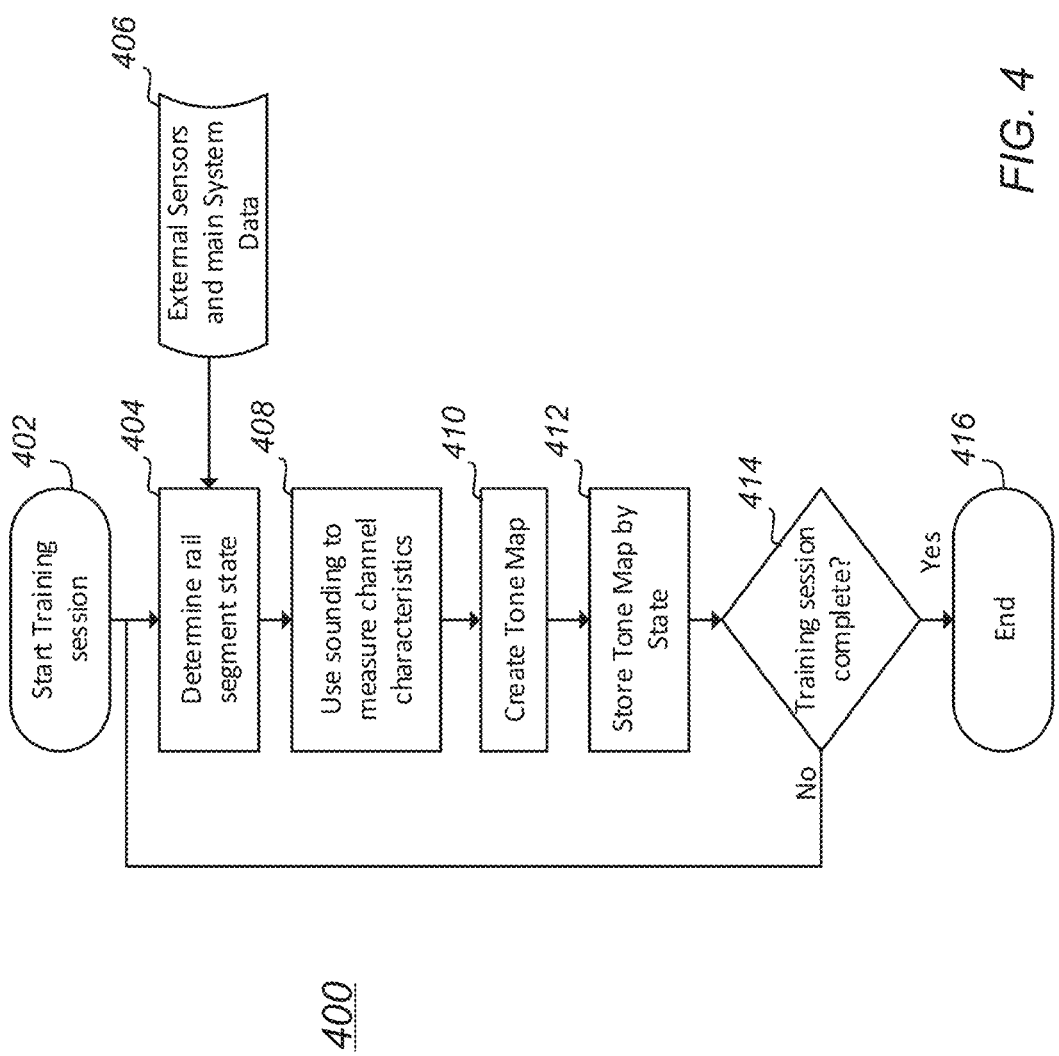
FIG. 4 is a data flow illustrating a training session to collect channel information for each state.

FIG. 4 is a data flow illustrating a training session to collect channel information for each state 400. The data flow of FIG. 4 can be described in context of FIGS. 1-3. The training session begins at 400, and at 404, the system will determine the rail segment state. In one exemplary embodiment, a main controller 24 governs the training session. The main controller 24 polls or otherwise receives status information from each central coordinator 26a-26m regarding the carts 22a-22i that are operating on the respective segment. In some cases, the training session is passive, and data is periodically or asynchronously collected during normal operations. In other cases, the main controller 24 will direct certain carts 22a-22i be positioned and operated on selected rail segments 18a-18m for training. One or more identifiers of each cart 22a-22i operating on a particular rail segment 18a-18m, such as a cart identifier (CID), for example, is passed back to the main controller 24.

The node controller 23 of cart 22 stores the requested information in memory 82. The CID, along with other information regarding network communications (e.g., NIK, NMK, NEK, and the like) may be stored in the key information module 84. Alternatively, or in addition, the CID and network communications information may be stored in the tone map module 82. When the cart 22 entered the rail segment 18, the central coordinator 26 established communications with node controller 23 of the cart 22. Accordingly, the central coordinator is in some cases already aware of every cart operating on the rail segment. Thus, the CID of each cart may already be stored in the key information module 64 or other information module 68 of memory 62 in the central coordinator 26.

At 406, external sensor data and main system data is also collected. The data may be collected by the optional sensor module 92 of cart 22. In this case, the sensor data is passed via powerline communications through the PLC interfaces 88, 78, 74 respectively to the central coordinator 26. The data may also be collected by the optional sensor module 72 of the central coordinator 26. The data is passed to the main controller 24 via the second communication medium 32. In other embodiments, for example when the optional sensors modules 72, 92 are not present, the PLC protocol can determine characteristics of a channel (i.e., a tone or group of tones) by sending messages between devices. These sounding and channel estimation data functions operate to determine how good or bad particular communications are.

Exemplary sensor data may include rail segment voltage, current, measured signal strength, relative noise, fault conditions, operating mode, rail segment type, rail segment length, rail segment material, temperature gauge information, humidity gauge information, cart or other counter information, motion sensor data, vibration data, and other like data. Exemplary system data may include a count and orientation of rail segments in the system, a number of operable or operating carts, an operating mode, known noise characteristics, and the like. Some or all of the sensor and system data may be passed directly to the main controller 24. Alternatively, or in addition, some or all of the sensor and system data may be passed through one or more central coordinators 26a-26m.

Processing at 408 carries out one or more sounding acts on each rail segment 18a-18m. In some cases, the sounding acts occur concurrently on two or more rail segments; in other cases, sounding acts occur serially on different rail segments. The acts may include sending known signals at known frequencies, amplitudes, and other characteristics. Correspondingly, measurements are taken of responses, echoes, or other return signals. The transmitted signal characteristics may be directed by the main controller 24 or selected and applied by the respective central coordinator 26a-26m. The transmitted signal characteristics are gathered by the main controller 24 and the measurement data may also be passed to the main controller 24.

Tone map data stored in one or both of the tone map modules 86 and 66 respectively may be used to direct communications of initial sounding acts. Typically, a default set of tone map data is stored in memory to facilitate initial communications. Subsequently, the sounding acts are carried out to generate information suitable to update one or more tone maps. In some cases, the instructions for carrying out the sounding acts to generate and communicate sounding signals are stored in one or both of tone map module 86 and tone map module 66. The tone map data is used to facilitate the physical passing of communication signals by the PLC interface 88 of cart 22 and the PLC interface 78 coupled to the rail segment 18.

Processing advances to 410 where a tone map is created. In some cases, the main controller 24 creates a tone map. In some cases, a tone map is created by the central coordinator 26 and stored in the tone map module 66 of memory 62. In this memory space, the central coordinator may store a tone map for every cart 22 operating on rail segment 18. In at least some cases where one or more of the tone maps are created by the central coordinator 26, the tone maps are passed to the main controller 24.

The main controller 24 will store one or more tone maps along with the state information under which the tone map was created at 412. Tone maps may be stored in memory 42, or tone maps may be stored in an optional database 76. The optional database 76 may be arranged within the main controller 24 or external to the main controller 24. Tone maps may also be stored in some other storage structure. Generally, tone maps are stored to facilitate rapid retrieval based on an identified state index. As illustrated in FIG. 3, the database 76 may optionally be accessed only by the main controller 24, only by one or more central coordinators 26, or by both a main controller 24 and the central coordinators 26.

At 414, if the training session is complete, processing ends at 416. Alternatively, processing returns to 404 where a new rail segment state is determined. The end of the training process of FIG. 4 may include passing one or more generated tone maps to a central coordinator 26, a cart 22, or both a central coordinator 26 and a cart 22.

Figure 5:
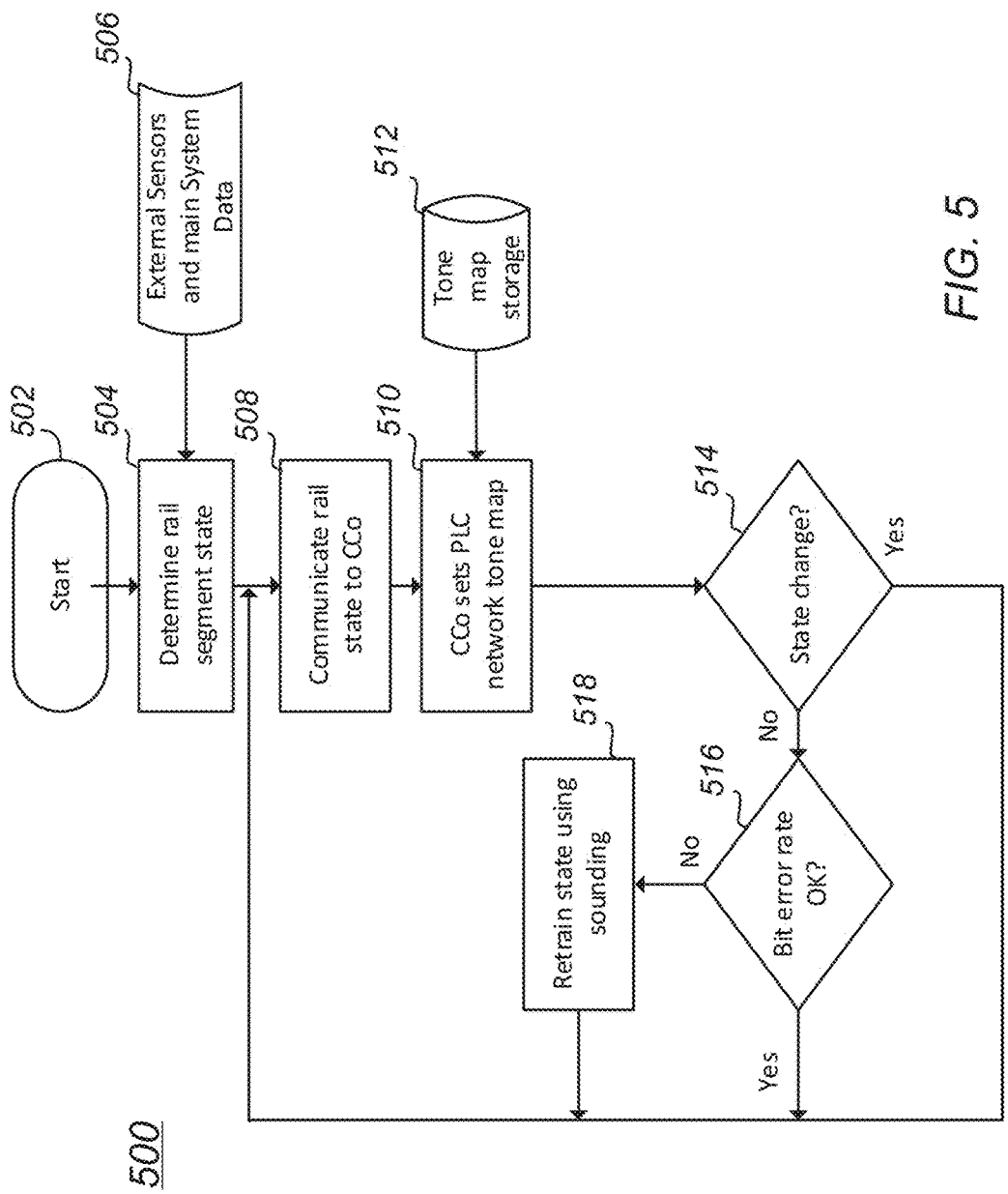
FIG. 5 is a data flow illustrating how the PLC CCo uses state information to set the PLC network tone map.

FIG. 5 is a data flow illustrating how the powerline communications central coordinator uses state information to set the powerline communications network tone map 500. The data flow of FIG. 5 can be described in context of FIGS. 1-3. Processing begins at 502 and is ongoing.

At 504, a rail segment state is determined and at 506, optional external sensor data and main system data is collected. In some embodiments, processing at 504 and 506 corresponds respectively to processing at 404 and 406 in FIG. 4.

At 508, the main controller 24 will communicate rail state information to a particular central coordinator (CCo), such as one of the central coordinators 26a-26m or central coordinator 26 of FIG. 3. The selected central coordinator corresponds to the rail segment state determined at 504. In some cases, the main controller 24 maintains current, past, and predicted state information. The state information may be stored in the status module 46 or the "other" information module 48 of memory 42 for example. In this way, the main controller 24 can communicate rail state information only to central coordinators that will be affected by an actual or predicted state change. In some cases, the main controller 24 will operate to change the tone map of every cart 22a-22i on a rail segment 18a-18m in real time just before the state changes. In some cases, particular tone maps are updated, in other cases, an index is changed so that a different tone map is selected, and in still other cases, a different mechanism is used. In these and in other cases, a network ID, a network encryption key, and other information may also be communicated just before the state changes. In many cases, the tone map, network keys information, and other network information is stored in memory 82 prior to when the cart enters the new rail segment. By these techniques, as soon as a rail segment state changes and communications would otherwise be disrupted, each cart 22a-22i will already be operating according to an updated tone map.

Processing at 510 commences when a central coordinator 26a-26m receives information from the main controller 24 or otherwise that the state of the respective rail segment 18a-18m has changed or that a state change is forthcoming. The particular central coordinator 26a-26m will then receive or otherwise retrieve an updated tone map at 512. In some cases, the updated tone map is stored in the tone map module 66 of memory 62. The central coordinator 26a-26m will integrate and act on updated powerline communication network characteristics directed by the updated tone map. One act performed by the central coordinator 26a-26m may be to pass the updated tone map information to each of the carts 22a-22i operating on the respective rail segment 18a-18m.

At 514, the updated communications are verified according to the updated rail segment state information. The verification may include additional network channel communication characteristic measurements. The verification may alternatively or in addition include determination of the current or future state of carts on the respective rail segment 18a-18m. Based on the one or more verifications made at 514, processing will either return to 508 or processing will advance to 516. At 516, data throughput measurements per channel are used to determine if an acceptable bit rate has been achieved on the powerline communications network of the respective rail segment 18a-18m.

If the bit error rate at 516 is determined by the system to be acceptable, processing falls back to 508. In these and in other cases, an acceptable bit error rate may be associated with a particular threshold, with a number of bits successfully communicated over a particular time period, or by any other means. In many cases, an acceptable bit error rate or some other determination of acceptable communication is selected based on the particular implementation. One acceptable measure of acceptable communications may or may not be suitable for another implementation. Alternatively, if the bit error rate at 516 is determined to be unacceptable, processing falls to 518 wherein the particular state may be retrained. The retraining may be performed as directed in acts illustrated in FIG. 4 and so described in the present disclosure. After retraining, processing returns to 508.

Certain words and phrases used in the specification are set forth as follows. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases may be provided within this patent document. Those of ordinary skill in the art will understand that in many, if not most instances, such definitions apply to prior as well as future uses of such defined words and phrases.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

A processor (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, and the like that execute instructions.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As known by one skilled in the art, a computing device such as a main controller 24, central coordinator 26, or node controller 23 has one or more memories, and each memory comprises any combination of transitory and non-transitory, volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, and/or the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts such as those illustrated in the data flow diagrams of FIGS. 4 and 5 and so described in the present disclosure and in some cases, one or more of the accompanying claims.

The terms, "real-time" and "real time," as used herein and in the claims that follow, are not intended to imply instantaneous processing, transmission, reception, or otherwise as the case may be. Instead, the terms, "real-time" and "real time," imply that the activity occurs over an acceptably short period of time (e.g., over a period of microseconds or milliseconds, or seconds or even minutes as understood by one of skill in the art), and that the activity may be performed on an ongoing basis (e.g., transmission of rail segment state information, cart information, or other information to and from main controller 24). An example of an activity that is not real-time is one that occurs over an extended period of time (e.g., many days or weeks) or that occurs based on intervention or direction by a person or some other human-directed activity.

FIG. 3 illustrates portions of non-limiting embodiments of particular computing devices. The illustrated main controller 24, central coordinator 26, and node controller 23 include operative hardware found in many conventional computing devices such as one or more processing units (CPU's), memory, serial and parallel input/output (I/O) circuitry compliant with various standards and protocols, wired and/or wireless networking circuitry (e.g., a communications transceiver), and other hardware not shown for simplicity. The computing devices may further includes operative software found in a conventional computing devices such as an operating system, software drivers to direct operations through the I/O circuitry, networking circuitry, and other peripheral component circuitry. In addition, one or more of the computing devices of FIG. 3 may include operative application software such as network software for communicating with other computing devices, database software for building and maintaining databases, and task management software for distributing the communication and/or operational workload amongst various CPU's. In some cases, one or more of the computing devices of FIG. 3, such as the main controller 24, database 76, and others may be formed as a single hardware machine having the hardware and software listed herein, and in other cases, the computing device is a networked collection of hardware and software machines working together in a server farm (i.e., in "the cloud") to execute the functions described herein. Certain conventional hardware and software of the computing devices is not shown in FIG. 3 for simplicity.

When so arranged as described herein, each computing device may be transformed from a generic and unspecific computing device to a combination device comprising hardware and software configured for a specific and particular purpose.

FIGS. 4 and 5 are data flow diagrams illustrating processes that may be used by embodiments of the computing devices that implement the powerline communication embodiments described herein. In this regard, each described process may represent a module, segment, or portion of code, which comprises one or more executable instructions for implementing the specified logical function(s). It is noted that in some implementations, the functions illustrated and described in the processes may occur in a different order, may include additional functions, may occur concurrently, and/or may be omitted.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A powerline communication system, comprising:
a plurality of rail segment power supplies;
a plurality of rail segments, each of the plurality of rail segments being electrically isolated from others of the plurality of rail segments, each of the plurality of rail segments configured to receive power from a respective rail segment power supply of the plurality of rail segment power supplies;
at least one cart configured for operation on the plurality of rail segments, the at least one cart having a drive mechanism, and the at least one cart having a cart controller configured for powerline communications, wherein each of the plurality of rail segments has a current state defined at least in part by cart information representing one or more carts operating on the respective rail segment;
a plurality of central coordinators respectively coupled to corresponding rail segments of the plurality of rail segments, each central coordinator of the plurality of central coordinators being configured to execute a respective sounding protocol, of a plurality of sounding protocols, on the corresponding rail segment, and each central coordinator of the plurality of central coordinators being configured to store a respective current tone map, of a plurality of current tone maps, associated with the current state of the corresponding rail segment; and
a main controller communicatively coupleable to each of the plurality of central coordinators, the main controller being configured to direct execution of the respective sounding protocols of the plurality of central coordinators.

2. The powerline communication system according to claim 1 wherein the main controller is configured to recognize an imminent state change to at least one of the plurality of rail segments.

3. The powerline communication system according to claim 2 wherein based on the recognition of the imminent state change to the at least one of the plurality of rail segments, the main controller is configured to communicate information representing an updated tone map associated with an updated state of the respective one of the plurality of rail segments to a central coordinator coupled to the respective one of the plurality of rail segments.

4. The powerline communication system according to claim 3 wherein after receiving the information representing the updated tone map, the central coordinator coupled to the respective one of the plurality of rail segments is configured to pass updated tone map information to each cart that will be operating on the respective one of the plurality of rail segments after the imminent state change.

5. The powerline communication system according to claim 2 wherein based on the recognition of the imminent state change to the at least one of the plurality of rail segments, the main controller is configured to communicate information representing a second updated tone map associated with an updated state of a rail segment adjacent to the respective one of the plurality of rail segments to the central coordinator coupled to the respective one of the plurality of rail segments.

6. The powerline communication system according to claim 5 wherein after receiving the information representing the second updated tone map, the central coordinator coupled to the respective one of the plurality of rail segments is configured to pass second updated tone map information to each cart that will be operating on the rail segment adjacent to the respective one of the plurality of rail segments after the imminent state change.

7. The powerline communication system according to claim 1 wherein each of the plurality of rail segments is configured to operate as a logical subnet having an associated network identifier and an associated network encryption key.

8. The powerline communication system according to claim 1 wherein each sounding protocol is arranged to characterize a noise environment and record channel characteristics for each possible state of the corresponding rail segment.

9. The powerline communication system according to claim 1 wherein each sounding protocol is executed during a training session, the training session arranged to capture noise environment and channel characteristics for each possible state of the corresponding rail segment.

10. The powerline communication system according to claim 1 wherein the main controller is configured to collect and average sounding data, and use the averaged sounding data to generate tone map information.

11. A method of powerline communications on a rail system, comprising:
providing a first rail segment and a second rail segment, the first and second rail segments electrically isolated from each other;
operating a powerline communication-enabled vehicle on the rail system, the powerline communication-enabled vehicle arranged to travel from the first rail segment to the second rail segment;
operating a first powerline communication subnet on the first rail segment, the first powerline communication subnet defined at least in part by a first network identifier;
operating a second powerline communication subnet on the second rail segment, the second powerline communication subnet defined at least in part by a second network identifier;
operating a first sounding protocol on the first powerline communication subnet, the first sounding protocol arranged to collect network characteristics under selected states of the first rail segment, each selected state defined by powerline communication-enabled vehicles operating on the first rail segment;
generating a tone map for each state of the first rail segment;
recognizing an imminent state change to occur on the first rail segment, a state change defined by at least one powerline communication-enabled vehicle entering or exiting a rail segment; and
communicating first updated tone map information to a central coordinator associated with the first rail segment, the first updated tone map information corresponding to the imminent state change to occur on the first rail segment.

12. The method according to claim 11 wherein operating the first powerline communication subnet includes ciphering data according to a first network encryption key, and wherein operating the second powerline communication subnet includes ciphering data according to a second network encryption key.

13. The method according to claim 11, comprising:
operating a second sounding protocol on the second powerline communication subnet, the second sounding protocol arranged to collect network characteristics under selected states of the second rail segment, each selected state defined by powerline communication-enabled vehicles operating on the second rail segment;
generating a tone map for each state of the second rail segment;
recognizing an imminent state change to occur on the second rail segment; and
communicating second updated tone map information to a central coordinator associated with the second rail segment, the second updated tone map information corresponding to the imminent state change to occur on the second rail segment.

14. The method according to claim 13, comprising:
communicating network information associated with the updated tone map information corresponding to the imminent state change to occur on the second rail segment from the central coordinator associated with the first rail segment to a first powerline communication-enabled vehicle operating on the first rail segment, the first powerline communication-enabled vehicle operating on the first rail segment being a vehicle that will operate on the second rail segment after the imminent state change occurs on the second rail segment.

15. The method according to claim 14 wherein the network information associated with the updated tone map information corresponding to the imminent state change to occur on the second rail segment includes the second network identifier.

16. The method according to claim 11 wherein the first sounding protocol is executed during a first training session, the first training session arranged to capture noise environment and channel characteristics for each possible state of the first rail segment.

17. A rail system configured for communication according to a powerline communications protocol, comprising:
a main controller of the rail system;
a first rail segment;
a second rail segment mechanically coupled to the first rail segment, the first and second rail segments electrically isolated from each other, wherein the first and second rail segments are configured to permit travel of powerline communication-enabled vehicles from one rail segment to another rail segment;
a first central coordinator, the first central coordinator configured to:
operate a first powerline communication subnet on the first rail segment, the first powerline communication subnet defined at least in part by a first network identifier;
operate a first sounding protocol on the first powerline communication subnet, the first sounding protocol arranged to collect network characteristics under selected states of the first rail segment, each selected state defined by powerline communication-enabled vehicles operating on the first rail segment; and
communicate the collected network characteristics under the selected states of the first rail segment to the main controller; and
a second central coordinator, the second central coordinator configured to:
operate a second powerline communication subnet on the second rail segment, the second powerline communication subnet defined at least in part by a second network identifier, wherein data passed on the second powerline communication subnet is ciphered according to a second network encryption key;
operate a second sounding protocol on the second powerline communication subnet, the second sounding protocol arranged to collect network characteristics under selected states of the second rail segment; and communicate the collected network characteristics under the selected states of the second rail segment to the main controller.

18. The rail system according to claim 17, wherein the main controller is configured to:
   generate a plurality of tone maps based on the collected network characteristics under the selected states of the first rail segment and the collected network characteristics under the selected states of the second rail segment;
   recognize a first imminent state change to occur on the first rail segment and a second imminent state change to occur on the second rail segment, a state change defined by at least one powerline communication-enabled vehicle entering or exiting a rail segment;
   communicate information representing a first updated tone map to the first central coordinator, the first updated tone map corresponding to the first imminent state change; and
   communicate information representing a second updated tone map to the second central coordinator, the second updated tone map corresponding to the second imminent state change.

19. The rail system according to claim 18, wherein the first central coordinator controller is configured to:
   communicate network information associated with the first updated tone map to a first powerline communication-enabled vehicle that will be operating on the first rail segment according to the first imminent state change; and
   communicate network information associated with the second updated tone map to a second powerline communication-enabled vehicle that will be operating on the second rail segment according to the second imminent state change.

20. The rail system according to claim 17, wherein the main controller is configured to:
   execute a first training session, the first training session arranged to capture noise environment and channel characteristics for each possible state of the first rail segment.

21. The rail system according to claim 17 wherein the first and second rail segments are communicatively isolated from each other.

22. A powerline communication system, comprising:
   a plurality of rail segments, each of the plurality of rail segments electrically isolated from others of the plurality of rail segments, each of the plurality of rail segments configured to receive power from a rail segment power supply;
   at least one cart configured for operation on the plurality of rail segments, the at least one cart having a drive mechanism, and the at least one cart having a cart controller configured for powerline communications, wherein each of the plurality of rail segments has a current state defined at least in part by cart information representing carts operating on the respective rail segment;
   a plurality of central coordinators, each central coordinator of the plurality of central coordinators coupled to a respective one of the plurality of rail segments, each central coordinator of the plurality of central coordinators configured to execute a sounding protocol on the respective one of the plurality of rail segments, and each central coordinator of the plurality of central coordinators configured to store a current tone map associated with the current state of the respective one of the plurality of rail segments; and
   a main controller, the main controller communicatively coupleable to each of the plurality of central coordinators, the main controller configured to direct execution of the sounding protocol on each of the plurality of central coordinators, wherein each of the plurality of rail segments is configured to operate as a logical subnet having an associated network identifier and an associated network encryption key.

23. The powerline communication system according to claim 22, wherein the main controller is configured to recognize an imminent state change to at least one of the plurality of rail segments and, based on the recognition of the imminent state change to the at least one of the plurality of rail segments, the main controller is configured to communicate information representing an updated tone map associated with an updated state of the respective one of the plurality of rail segments to a central coordinator coupled to the respective one of the plurality of rail segments.

24. The powerline communication system according to claim 23, wherein after receiving the information representing the updated tone map, the central coordinator coupled to the respective one of the plurality of rail segments is configured to pass updated tone map information to each cart that will be operating on the respective one of the plurality of rail segments after the imminent state change.

25. A powerline communication system, comprising:
   a plurality of rail segments, each of the plurality of rail segments electrically isolated from others of the plurality of rail segments, each of the plurality of rail segments configured to receive power from a rail segment power supply;
   at least one cart configured for operation on the plurality of rail segments, the at least one cart having a drive mechanism, and the at least one cart having a cart controller configured for powerline communications, wherein each of the plurality of rail segments has a current state defined at least in part by cart information representing carts operating on the respective rail segment;
   a plurality of central coordinators, each central coordinator of the plurality of central coordinators coupled to a respective one of the plurality of rail segments, each central coordinator of the plurality of central coordinators configured to execute a sounding protocol on the respective one of the plurality of rail segments, and each central coordinator of the plurality of central coordinators configured to store a current tone map associated with the current state of the respective one of the plurality of rail segments; and
   a main controller, the main controller communicatively coupleable to each of the plurality of central coordinators, the main controller configured to direct execution of the sounding protocol on each of the plurality of central coordinators, wherein the main controller is configured to collect and average sounding data, and use the averaged sounding data to generate tone map information.

26. The powerline communication system according to claim 25, wherein the main controller is configured to recognize an imminent state change to at least one of the plurality of rail segments and, based on the recognition of the imminent state change to the at least one of the plurality of rail segments, the main controller is configured to communicate information representing an updated tone map associated with an updated state of the respective one of the plurality of rail segments to a central coordinator coupled to the respective one of the plurality of rail segments.

27. The powerline communication system according to claim 26, wherein after receiving the information representing the updated tone map, the central coordinator coupled to the respective one of the plurality of rail segments is configured to pass updated tone map information to each cart that will be operating on the respective one of the plurality of rail segments after the imminent state change.

* * * * *